United States Patent
Jeong et al.

(10) Patent No.: US 10,296,315 B2
(45) Date of Patent: May 21, 2019

(54) MULTIPLE-THREAD PROCESSING METHODS AND APPARATUSES

(71) Applicant: Samsung Electronics Co., Ltd., Suwon-si (KR)

(72) Inventors: Minkyu Jeong, Yongin-si (KR); Haewoo Park, Seoul (KR); Minyoung Son, Hwaseong-si (KR); Choonki Jang, Anyang-si (KR); Yoonseo Choi, Seoul (KR); Donghoon Yoo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 198 days.

(21) Appl. No.: 14/816,265

(22) Filed: Aug. 3, 2015

(65) Prior Publication Data

US 2016/0170799 A1    Jun. 16, 2016

(30) Foreign Application Priority Data

Dec. 12, 2014   (KR) .................. 10-2014-0179352

(51) Int. Cl.
*G06F 8/41*     (2018.01)
*G06F 9/38*     (2018.01)

(52) U.S. Cl.
CPC ............ *G06F 8/452* (2013.01); *G06F 8/4441* (2013.01); *G06F 8/41* (2013.01); *G06F 8/433* (2013.01); *G06F 8/443* (2013.01); *G06F 9/3887* (2013.01)

(58) Field of Classification Search
CPC . G06F 8/52; G06F 8/452; G06F 8/443; G06F 9/3842

See application file for complete search history.

(56) References Cited

U.S. PATENT DOCUMENTS

| | | | | |
|---|---|---|---|---|
| 6,088,044 A | * | 7/2000 | Kwok | G06F 9/50 345/504 |
| 6,401,240 B1 | * | 6/2002 | Summers | G06F 11/3466 714/E11.2 |
| 7,100,164 B1 | * | 8/2006 | Edwards | G06F 8/433 717/136 |
| 8,615,770 B1 | | 12/2013 | Stratton et al. | |
| 9,043,769 B2 | * | 5/2015 | Vorbach | G06F 8/4441 717/149 |

(Continued)

FOREIGN PATENT DOCUMENTS

| | | |
|---|---|---|
| JP | 2000-315163 A | 11/2000 |
| JP | 3337926 B2 | 8/2002 |

(Continued)

*Primary Examiner* — Lewis A Bullock, Jr.
*Assistant Examiner* — Gilles R Kepnang
(74) *Attorney, Agent, or Firm* — Harness, Dickey & Pierce, P.L.C.

(57) ABSTRACT

Multiple-thread processing apparatuses and methods are provided. The multiple-thread processing method may include searching for loops in a plurality of threads, calculating a number of repetitions of each of found loops in respective threads among the plurality of threads, determining one or more threads based on the calculated number of repetitions of each of the found loops, dividing at least one of the one or more determined threads into child threads, and processing the child threads separately from one another in the plurality of threads.

5 Claims, 9 Drawing Sheets

(56) References Cited

U.S. PATENT DOCUMENTS

| | | | |
|---|---|---|---|
| 2004/0117781 A1* | 6/2004 | Bera | G06F 8/452 |
| | | | 717/160 |
| 2005/0144602 A1* | 6/2005 | Ngai | G06F 8/41 |
| | | | 717/151 |
| 2008/0005726 A1* | 1/2008 | Collard | G06F 8/52 |
| | | | 717/153 |
| 2008/0098399 A1* | 4/2008 | Sakurai | G06Q 10/107 |
| | | | 718/103 |
| 2009/0217253 A1* | 8/2009 | Song | G06F 8/456 |
| | | | 717/161 |
| 2010/0269102 A1* | 10/2010 | Latorre | G06F 9/3842 |
| | | | 717/130 |
| 2011/0047534 A1* | 2/2011 | Ye | G06F 8/443 |
| | | | 717/160 |
| 2012/0079467 A1* | 3/2012 | Tojo | G06F 8/452 |
| | | | 717/150 |
| 2012/0254888 A1* | 10/2012 | Kalogeropulos | G06F 8/452 |
| | | | 718/107 |
| 2013/0191817 A1* | 7/2013 | Vorbach | G06F 8/4441 |
| | | | 717/150 |
| 2013/0232476 A1* | 9/2013 | Varma | G06F 8/443 |
| | | | 717/150 |
| 2014/0149719 A1* | 5/2014 | Tabaru | G06F 9/3001 |
| | | | 712/221 |
| 2015/0277877 A1* | 10/2015 | Feng | G06F 8/443 |
| | | | 717/155 |
| 2016/0085530 A1* | 3/2016 | Duran Gonzalez | G06F 8/452 |
| | | | 717/105 |

FOREIGN PATENT DOCUMENTS

| | | |
|---|---|---|
| JP | 2004-152204 A | 5/2004 |
| JP | 5521644 B2 | 4/2014 |

* cited by examiner

FIG. 4

```
void main()
{
    color = vec4(0.0, 0.0,               ─410
                 0.0, 0.0);
    c = V();  ─420
    X();  ─430
                                    450
    for (int i = 0; i < (c); ++i)
    {
        vec4 temp = Y(i);              440
        color += temp;
    } gl_Color = color;  ─460
}
```

MULTIPLE-THREAD PROCESSING METHODS AND APPARATUSES

CROSS-REFERENCE TO RELATED APPLICATION(S)

This application claims the benefit of Korean Patent Application No. 10-2014-0179352, filed on Dec. 12, 2014, in the Korean Intellectual Property Office, the entire disclosure of which is incorporated herein by reference for all purposes.

BACKGROUND

1. Field

The following description relates to multiple-thread processing methods and apparatuses.

2. Description of the Related Art

A graphics system uses a single-instruction-multiple-thread (SIMT) model that processes threads by allocating a single thread to single data. In this case, since threads use the same code, an instruction may be read from a memory once and be shared in use. Since the threads are simultaneously performed, high performance may be obtained in proportion to the number of processors. In addition, in order to share a command that is read once, a plurality of threads may be performed together in synchronization with one another. However, in a case where the threads cannot be performed immediately due to other factors, a program may be performed by changing the corresponding threads to other threads.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a multiple-thread processing method includes: searching for loops in a plurality of threads; calculating a number of repetitions of each of found loops in respective threads among the plurality of threads; determining one or more threads among the plurality of threads based on the calculated number of repetitions of each of the found loops; dividing at least one of the one or more determined threads into child threads; and processing the child threads separately from one another in the plurality of threads.

The multiple-thread processing method may further include processing the plurality of threads and performing reduction on the processed plurality of threads.

The determining of the threads may include determining rankings of the respective threads among the plurality of threads in descending order of the calculated number of repetitions of each of the found loops, and determining the one or more threads based on the determined rankings of the respective threads among the plurality of threads.

The determining of the one or more threads may include determining a top-ranked thread.

The determining of the one or more threads may include determining a top-ranked thread and a second-ranked thread.

The determining of the one or more threads may include determining whether parallel reduction in the loops of the one or more determined threads is possible.

The dividing may include processing threads, among the plurality of threads, other than the determined threads and dividing the one or more determined threads into child threads of each thread of the plurality of threads.

The dividing may include processing some threads among the plurality of threads and dividing the one or more determined threads into child threads of the processed threads among the plurality of threads.

The multiple-thread processing method may further include outputting a reduction result.

A computer program may be stored in a medium, and may be combined with hardware to process the multiple-thread processing method.

According to another general aspect, a multiple-thread processing apparatus includes: a search processor configured to search for loops in a plurality of threads; a calculator configured to calculate a number of repetitions of each of found loops in respective threads among the plurality of threads; a thread determiner configured to determine one or more threads among the plurality of threads based on the calculated number of repetitions of each of the found loops; a divider configured to divide at least one of the one or more determined threads into child threads; and a thread processor configured to process the child threads separately from one another in the plurality of threads.

The thread processor may be further configured to process the plurality of threads, and the multiple-thread processing apparatus may further include a reduction unit that performs reduction on the processed threads.

The thread determiner may be configured to determine rankings of the respective threads among the plurality of threads in descending order of the calculated number of repetitions of each of the found loops, and determine the one or more threads based on the determined rankings of the respective threads among the plurality of threads.

The thread determiner may be configured to determine a top-ranked thread.

The thread determiner may be configured to determine a top-ranked thread and a second-ranked thread.

The thread determiner may be configured to determine whether parallel reduction in the loops of the one or more determined threads is possible.

The divider may be configured to process threads, among the plurality of threads, other than the determined threads and divide the one or more determined threads into child threads of each thread of the plurality of threads.

The divider may be configured to process some threads among the plurality of threads, and divide the one or more determined threads into child threads of the processed threads among the plurality of threads.

The multiple-thread processing apparatus may further include an output configured to output a reduction result.

According to another general aspect, a multiple-thread processing apparatus may include at least one processor configured to determine a thread among a plurality of threads based on a calculated number of repetitions of a loop in respective threads among the plurality of threads, divide the determined thread into child threads respectively allocated to selected threads among the plurality of threads, and process the child threads respectively in the selected threads.

The determined thread may be a thread having a largest number of repetitions of the loop.

Other features and aspects will be apparent from the following detailed description, the drawings, and the claims.

BRIEF DESCRIPTION OF THE DRAWINGS

FIGS. 4 to 8 are diagrams describing various multiple-thread processing methods;

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

General and widely used terms have been employed herein, in consideration of functions provided in the example embodiments, and may vary according to an intention of one of ordinary skill in the art, a precedent, or emergence of new technologies. Additionally, in some cases, the applicant may arbitrarily select specific terms, in which case, the applicant will provide the meaning of the terms in the description of the embodiments. Accordingly, It will be understood that the terms used herein should be interpreted as having a meaning that is consistent with their meaning in the context of the relevant art and will not be interpreted in an idealized or overly formal sense unless expressly so defined herein.

When it is described that a component or device includes some elements, it should be understood that it may include only those elements, or it may include other elements as well as those elements if there is no specific limitation.

Figure 1:
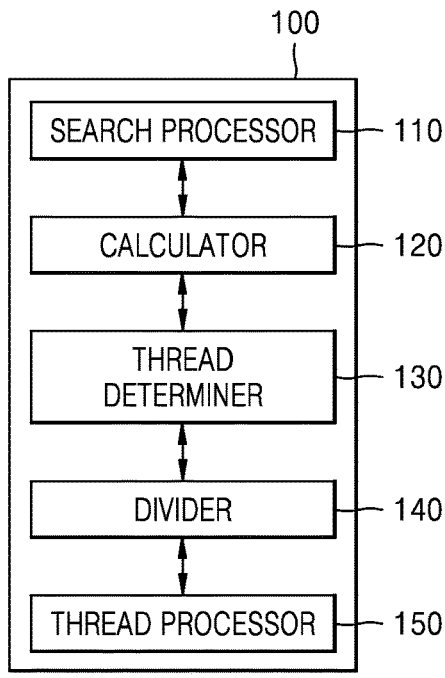
FIG. 1 is a block diagram of a multiple-thread processing apparatus according to an example embodiment.

FIG. 1 is a block diagram of a multiple-thread processing apparatus 100 according to an example embodiment. Referring to FIG. 1, the multiple-thread processing apparatus 100 includes a search unit, or search processor 110, a calculation unit, or calculator 120, a thread determination unit, or thread determiner 130, a division unit, or divider 140, and a processing unit, or thread processor 150. The search unit 110, the calculation unit 120, the thread determination unit 130, the division unit 140 and the processing unit 150 may be interconnected as illustrated in FIG. 1, and may be implemented, for example, in the form of processors connected to a memory. The results of operations performed by the search unit 110, calculation unit 120, thread determination unit 130, the division unit 140 and the processing unit 150 may be stored in the memory.

The search unit 110 searches for loops in a plurality of threads. A "thread" may be an execution path existing in a process during execution of a computer program. A "loop" may be a portion that is required to be repeatedly processed in a code to be processed in a thread of a processor. For example, the search unit 110 may search for a "for statement" in a code to be processed in a thread.

The calculation unit 120 calculates the number of repetitions of each loop of found loops in the plurality of threads. For example, the calculation unit 120 may calculate how many times the "for statement" is repeatedly executed in the code to be processed in the thread.

The thread determination unit 130 determines, or selects, threads among the plurality of threads based on the calculated number of repetitions of each loop of the found loops. In addition, the thread determination unit 130 may determine the rankings of the threads in descending order of the calculated number of repetitions of each of the found loops. Furthermore, the thread determination unit 130 may determine one or more threads based on the determined rankings of the threads. For example, the thread determination unit 130 may determine the first-ranked, or top-ranked thread. As another example, the thread determination unit 130 may determine the top-ranked thread and the second-ranked thread. The thread determination unit 130 may determine whether parallel reduction in the loops of the determined threads is possible. The reduction may mean that calculations in the loops of the thread are performed and the calculation results are merged. The phrase "parallel reduction is possible" may mean that a result obtained when a code belonging to a loop of one thread is performed is the same as a result obtained when a code to be processed in one thread is processed separately in a plurality of threads and the processing results are merged. For example, operations such as addition, multiplication, a selecting a maximum value, or selecting a minimum value are reduction-possible operations. In a case where the parallel reduction in the loop of the thread is impossible, a result obtained when the threads are processed by an existing method is different from a result obtained when the threads are divided and then processed. Thus, it is necessary to determine whether the reduction is possible.

The division unit 140 divides some of the determined threads into child threads. The child threads are threads obtained by dividing the loop to be processed in one thread. The child threads may be allocated to respective threads among the plurality of threads. The respective threads may process the child threads allocated thereto.

For example, the division unit 140 may process threads other than the determined threads ("other threads"), among the plurality of threads, and divide the determined threads into child threads of each of the plurality of threads. Alternatively, the division unit 140 may process one or more threads among the plurality of threads and divide the determined threads into child threads of the processed threads. The processing unit 150 then further processes the processed threads including the child threads. For example, the processing unit 150 may process one or more threads among the plurality of threads and then process the child threads included in the one or more processed threads.

Figure 2:
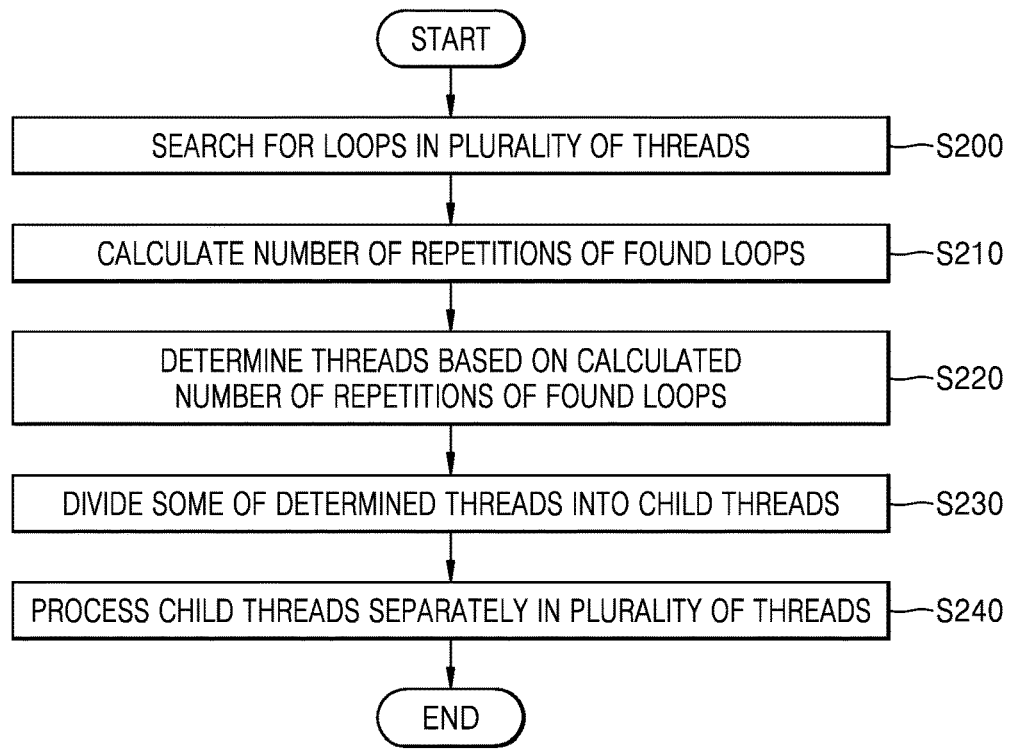
FIG. 2 is a flowchart of a multiple-thread processing method according to an example embodiment.

FIG. 2 is a flowchart of a multiple-thread processing method according to an example embodiment.

In operation S200, loops are searched for from a plurality of threads. For example, the multiple-thread processing apparatus 100 may search for loops in a zeroth thread, a first thread, a second thread, and a third thread among eight threads of a processor.

In operation S210, the number of repetitions of each of the found loops are calculated. For example, the multiple-thread processing apparatus 100 may calculate the number of repetitions of each of the loops included in the zeroth to third threads from which the loops are searched for among the eight threads of the processor. That is, the number of repetitions of the loop in the zeroth thread may be two, the number of repetitions of the loop in the first thread may be one, the number of repetitions of the loop in the second thread may be five, and the number of repetitions of the loop in the third thread may be four.

In operation S220, the threads are determined based on the calculated number of repetitions of each of the loops. In addition, the rankings of the threads may be determined in descending order of the calculated number of repetitions of each of the loops. For example, when the number of repetitions of the loop in the zeroth thread is two, the number of repetitions of the loop in the first thread is one, the number of repetitions of the loop in the second thread is five, and the number of repetitions of the loop in the third thread is four, the multiple-thread processing apparatus 100 may determine the rankings of the threads such that the second thread, the third thread, the first thread, and the zeroth thread are ranked top (first), second, third, and fourth, respectively. In addition, the multiple-thread processing apparatus 100 may determine one or more threads based on the determined rankings of the threads. Alternatively, the multiple-thread processing apparatus 100 may determine the top-ranked thread and the second-ranked thread. For example, in the above case, the multiple-thread processing apparatus 100 may determine the second thread as the top-ranked thread and the third thread as the second-ranked thread. The multiple-thread processing apparatus 100 may determine one or more threads based on the determined rankings of the threads. For example, when the second thread, the third thread, the first thread, and the zeroth thread are ranked first, second, third, and fourth, respectively, the multiple-thread processing apparatus 100 may determine the top-ranked thread to be the second thread and the fourth-ranked thread to be the zeroth thread. In addition, the multiple-thread processing apparatus 100 may determine whether parallel reduction in the loops of the determined threads is possible.

In operation S230, some of the determined threads are divided into child threads. For example, the multiple-thread processing apparatus 100 may process threads other than the determined threads ("other threads") and then divide the determined threads into the child threads of each of the plurality of threads. According to a more specific example, when the determined threads are the second thread and the other threads are the zeroth thread, the first thread, and the third thread, the multiple-thread processing apparatus 100 may process the zeroth thread, the first thread, and the third thread and then divide the second thread into the child threads of the zeroth to third threads. Alternatively, the multiple-thread processing apparatus 100 may divide the determined threads into child threads of the processed threads among the plurality of threads. For example, when the determined thread is the second thread and the zeroth thread is processed, the multiple-thread processing apparatus 100 may divide the second thread into child threads of the zeroth thread.

In operation S240, the child threads may be processed separately from one another in the plurality of threads. For example, when the zeroth to third threads include the child threads obtained by dividing the second thread, the multiple-thread processing apparatus 100 may process the codes included in the child threads together with the existing codes of the zeroth to third threads.

Figure 3:
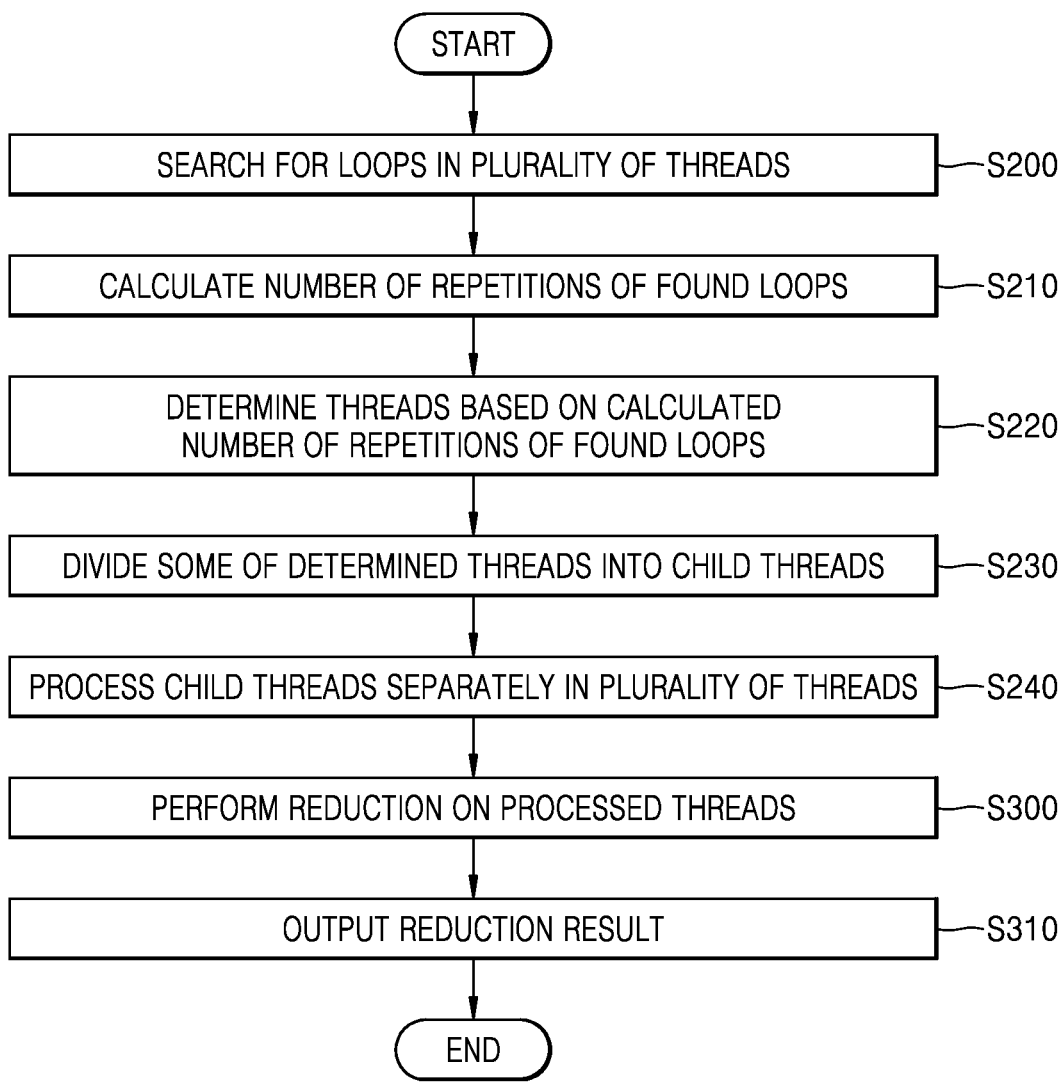
FIG. 3 is a flowchart of a multiple-thread processing method according to another example embodiment.

FIG. 3 is a flowchart of a multiple-thread processing method according to another embodiment.

According to the embodiment of FIG. 3, operations 200 through 240 may be performed as described above with respect to the embodiment of FIG. 2. Accordingly, a detailed description of these operations will not be repeated in the interest of conciseness.

In operation S300, reduction is performed on the processed threads. For example, the multiple-thread processing apparatus 100 may obtain a final result by performing reduction on the results of the processed threads. For example, when the number of threads is four, the result of the zeroth thread is 11, the result of the first thread is 2, the result of the second thread is 5, and the result of the third thread is 10, a reduction unit (1100 in FIG. 11) may obtain a final result of "11*2*5*10=1100" by performing multiplication reduction on the results of the zeroth to third threads.

In operation S310, the reduction result is output. For example, the multiple-thread processing apparatus 100 may display the reduction result on a display. The reduction result output from the multiple-thread processing apparatus 100 may be used as an input of other graphics processing.

FIGS. 4 to 8 are diagrams for describing various multiple-thread processing methods.

FIG. 4 illustrates a code 400 for processing a multiple-thread. For example, the code 400 may be a graphic shader code implemented for processing one pixel. "color=vec4 (0.0, 0.0, 0.0, 0.0);" 410 is a code that initializes a color value to (0, 0, 0, 0) so as to process each pixel. "c=V( );" 420 is a code that calls and stores a "V( )" function in "c". "X( );" 430 is a code that calls "X( )" function. "for(int i=0; i<c; ++i) {vec4 temp=Y(i); color+=temp;}" 440 is a code that represents a loop. That is, the code 440 that represents the loop increments i by one until i becomes a c value from 0. In this manner, the code in the loop is repeatedly executed. "vec4 temp=Y(i);" is a code that stores a Y(i) function value in a variable "vec4 temp". "color+=temp;" is a code that stores a "color+temp" value in a variable "color". In other words, when the two codes "vec4 temp=Y(i);" and "color+=temp;" are executed once, i increases, and when i becomes a c value by repeatedly executing the code, the repetition is stopped. That is, the color value is calculated by calling Y(0), Y(1), . . . , Y(c−1) functions and accumulating the function values. "gl_Color=color;" 460 stores the value of the variable "color" in a gl_Color value.

A multiple-thread processing method according to an embodiment will be described below with reference to FIG. 5. The processor may have eight threads 500. The eight threads 500 may include a zeroth thread (0), a first thread (1), a second thread (2), a third thread (3), a fourth thread (4), a fifth thread (5), a sixth thread (6), and a seventh thread (7). Each of the threads may execute the code 400 illustrated in FIG. 4. For example, in the case of the "c=V( );" 420, a V(0) value may represent a c value of the zeroth thread. Similarly, a V(1) value may represent a c value of the first thread. "V" illustrated in each of the threads of FIG. 5 means that a V( ) function is executed in each of the threads. In addition, "X" illustrated in each of the threads means that an X( ) function is executed in each of the threads. The number of "Y"s in each of the threads is equal to the number of times of execution of the loop code 440 of FIG. 4. That is, the number of "Y"s is equal to the value of the variable c. For example, since the second thread has eight Ys, c=8 and the loop code 440 is executed eight times.

The multiple-thread processing apparatus 100 may include a compiler. The compiler may compile the code of FIG. 5. In addition, the compiler may check two conditions. First, the compiler may check whether the number of repetitions of the loop is non-uniform between the threads. Second, the compiler may determine whether reduction in the result calculated in the loop of the thread is possible. Referring to FIG. 4, it can be seen that the color value obtained by repeating the loop is equal to the result obtained by separately calculating the temp value in parallel without repeating the loop and performing the reduction (addition reduction). When the two conditions are satisfied, the compiler may record that the non-uniform loops are repeated at a location where the loop of the code is started and the number of repetitions is contained in a memory space c (or a register space), together with the code. In addition, the compiler may record that the color value can be obtained by the addition reduction.

The multiple-thread processing apparatus 100 searches for loops from a plurality of threads. For example, the multiple-thread processing apparatus 100 determines whether the loop code 440 of FIG. 4 is executed in each of the threads of FIG. 5.

The multiple-thread processing apparatus 100 calculates the number of repetitions of each of found loops. For example, referring to FIG. 5, the number of repetitions of the loop in the zeroth thread is two, the number of repetitions of the loop in the first thread is one, the number of repetitions of the loop in the second thread is eight, the number of repetitions of the loop in the third thread is one, the number of repetitions of the loop in the fourth thread is one, the number of repetitions of the loop in the fifth thread is three, the number of repetitions of the loop in the sixth thread is two, and the number of repetitions of the loop in the seventh thread is one.

The multiple-thread processing apparatus 100 determines the thread having the largest number of repetitions of the loop. For example, referring to FIG. 5, the multiple-thread processing apparatus 100 determines the second thread as the thread having the largest number of repetitions of the loop.

The multiple-thread processing apparatus 100 may divide the determined threads into child threads of each of the plurality of threads. For example, referring to FIG. 6, the multiple-thread processing apparatus 100 may divide Y of the determined second thread into child threads 600 of each of the eight threads 500. As another example, the remaining threads, except for the second thread, which is the longest thread, may be executed first. After the execution of the remaining threads has been completed, the multiple-thread processing apparatus 100 may divide the second thread into the child threads of each of the eight threads.

After dividing the second thread into the child threads of each of the eight threads, the multiple-thread processing apparatus 100 may process the eight threads each including the child threads. For example, referring to FIG. 6, the multiple-thread processing apparatus 100 may further process the eight threads 500 each including the child threads 600.

Figure 5:
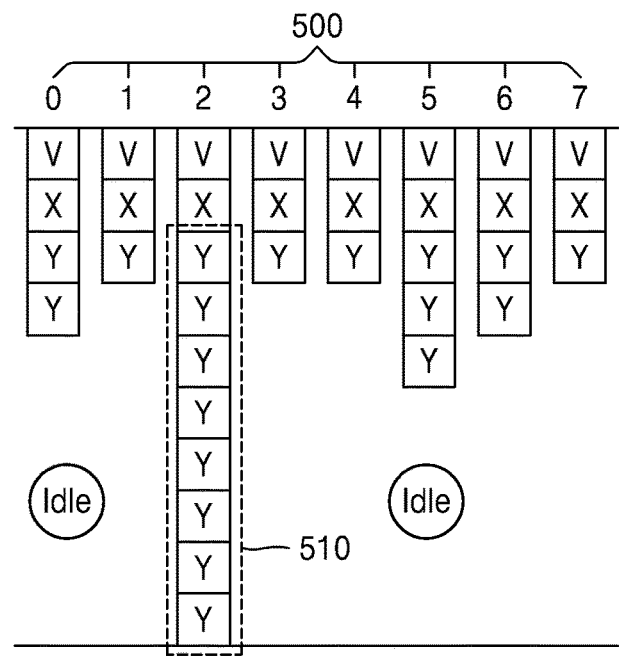
Figure 6:
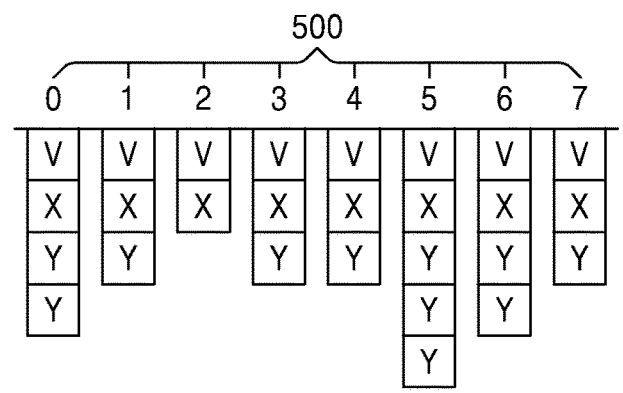

That is, referring to FIGS. 5 and 6, the c value is different in each of the threads, processing time is different in each of the threads, and all the threads are processed in synchronization with one another. Thus, once the remaining threads have been completely processed, the remaining threads are in an idle state until the second thread is processed. Therefore, as illustrated in FIG. 6, the total processing time may be shortened by dividing the second thread into the child threads of the eight threads 500. Then, the multiple-thread processing apparatus 100 may perform reduction on the processed threads. For example, a result value may be obtained by performing reduction on the values of the child threads 600 processed by each of the threads of FIG. 6. In addition, the multiple-thread processing apparatus 100 may output the reduction result.

Figure 7:
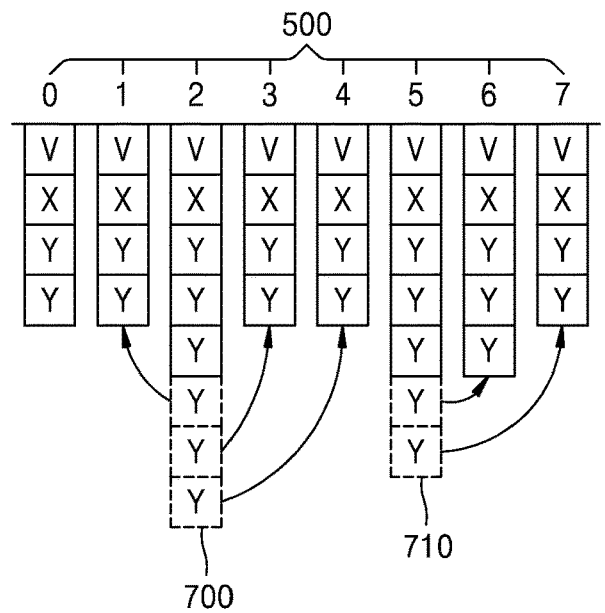

A multiple-thread processing method according to another embodiment will be described below with reference to FIG. 7. The multiple-thread processing apparatus 100 searches for loops from a plurality of threads. For example, the multiple-thread processing apparatus 100 determines whether the loop code 440 of FIG. 4 is executed in each of the threads of FIG. 7.

The multiple-thread processing apparatus 100 calculates the number of repetitions of each of found loops. For example, referring to FIG. 7, the number of repetitions of the loop in the zeroth thread is two times, the number of repetitions of the loop in the first thread is two times, the number of repetitions of the loop in the second thread is six times, the number of repetitions of the loop in the third thread is two times, the number of repetitions of the loop in the fourth thread is two times, the number of repetitions of the loop in the fifth thread is five times, the number of repetitions of the loop in the sixth thread is three times, and the number of repetitions of the loop in the seventh thread is two times.

The multiple-thread processing apparatus 100 determines the thread having the largest number of repetitions of the loop and the thread having the second largest number of repetitions of the loop. For example, referring to FIG. 7, the multiple-thread processing apparatus 100 determines the second thread as the thread having the largest number of repetitions of the loop and the fifth thread as the thread having the second largest number of repetitions of the loop. The multiple-thread processing apparatus 100 may divide the determined threads into child threads. For example, referring to FIG. 7, the multiple-thread processing apparatus 100 may divide Y 700 of the second thread and Y 710 of the fifth thread into child threads 600. In addition, the child threads may be processed separately from one other in some or all of the remaining threads (i.e., threads other than the second and fifth threads). For example, referring again to FIG. 7, the child threads 600 may be processed separately from one another in the first, third, fourth, sixth and seventh threads.

In addition, the multiple-thread processing apparatus 100 may determine the rankings of the threads in descending order of the calculated number of repetitions of each of the loops. The multiple-thread processing apparatus 100 may determine the top-ranked thread. In addition, the multiple-thread processing apparatus 100 may determine the second-ranked thread. For example, referring to FIG. 7, the number of repetitions of the loop in the zeroth thread is two, the number of repetitions of the loop in the first thread is two, the number of repetitions of the loop in the second thread is six, the number of repetitions of the loop in the third thread is two, the number of repetitions of the loop in the fourth thread is two, the number of repetitions of the loop in the fifth thread is five, the number of repetitions of the loop in the sixth thread is three, and the number of repetitions of the loop in the seventh thread is two. Accordingly, the second thread is ranked first, the fifth thread is ranked second, the sixth thread is ranked third, and the first thread, the third thread, the fourth thread, and the seventh thread are tied for fourth. Therefore, the multiple-thread processing apparatus 100 may determine the second thread as the top-ranked thread, based on the rankings of the threads. In addition, the multiple-thread processing apparatus 100 may determine the fifth thread as the second-ranked thread, based on the rankings of the threads. In addition, the multiple-thread processing apparatus 100 may determine one or more of the plurality of threads having arbitrary ranks. For example, the multiple-thread processing apparatus 100 may determine the top-ranked thread and the third-ranked thread, based on the rankings of the threads. Alternatively, the multiple-thread processing apparatus 100 may determine the top-ranked thread, the second-ranked thread, the third-ranked thread, and the fourth-ranked thread among the plurality of threads. That is, the multiple-thread processing apparatus 100 may determine three or more threads.

The multiple-thread processing apparatus 100 may process the threads each including the child threads. For example, referring to FIG. 7, the multiple-thread processing apparatus 100 may process the eight threads 500 each including the child threads 600. Then, the multiple-thread processing apparatus 100 may perform reduction on the processed threads. For example, a result value may be obtained by performing reduction on the values of the child threads 600 processed by each of the threads of FIG. 7. In addition, the multiple-thread processing apparatus 100 may output the reduction result.

Figure 8:
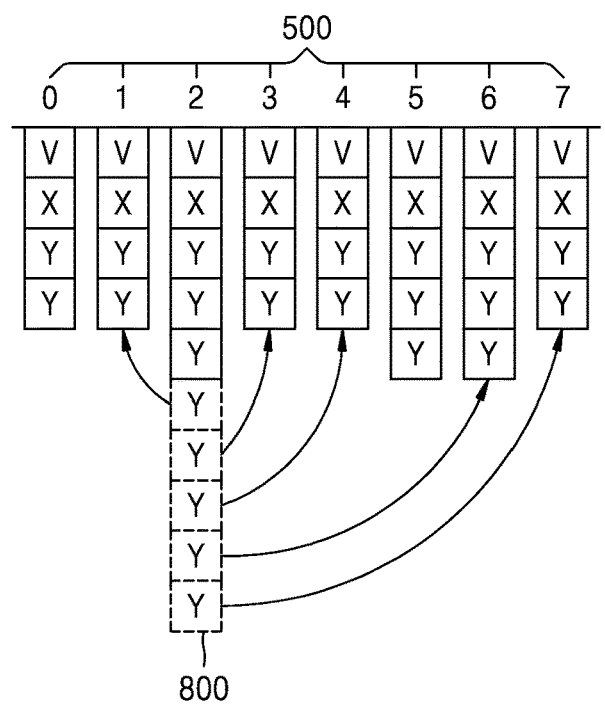

A multiple-thread processing method according to another embodiment will be described below with reference to FIG. 8. The multiple-thread processing apparatus 100 searches for loops from a plurality of threads. For example, the multiple-thread processing apparatus 100 determines whether the loop code 440 of FIG. 4 is executed in each of the threads of FIG. 8.

The multiple-thread processing apparatus 100 calculates the number of repetitions of each of found loops. For example, referring to FIG. 8, the number of repetitions of the loop in the zeroth thread is two, the number of repetitions of the loop in the first thread is two, the number of repetitions of the loop in the second thread is eight, the number of repetitions of the loop in the third thread is two, the number of repetitions of the loop in the fourth thread is two, the number of repetitions of the loop in the fifth thread is three, the number of repetitions of the loop in the sixth thread is three, and the number of repetitions of the loop in the seventh thread is two.

The multiple-thread processing apparatus 100 determines the thread having the largest number of repetitions of the loop. For example, referring to FIG. 8, the multiple-thread processing apparatus 100 determines the second thread as the thread having the largest number of repetitions of the loop.

The multiple-thread processing apparatus 100 may divide the determined thread into child threads of each of the plurality of threads. For example, referring to FIG. 8, the multiple-thread processing apparatus 100 may divide Y 800 of the determined second thread into child threads. In addition, the multiple-thread processing apparatus 100 may allocate the child threads to the processed threads.

The multiple-thread processing apparatus 100 processes the threads each including the child threads. For example, referring to FIG. 8, the multiple-thread processing apparatus 100 may process the eight threads 500 each including the child threads 600. Then, the multiple-thread processing apparatus 100 may perform reduction on the processed threads. For example, a result value may be obtained by performing reduction on the value of the child threads 600 processed by each of the threads of FIG. 8. In addition, the multiple-thread processing apparatus 100 may output the reduction result.

Figure 9:
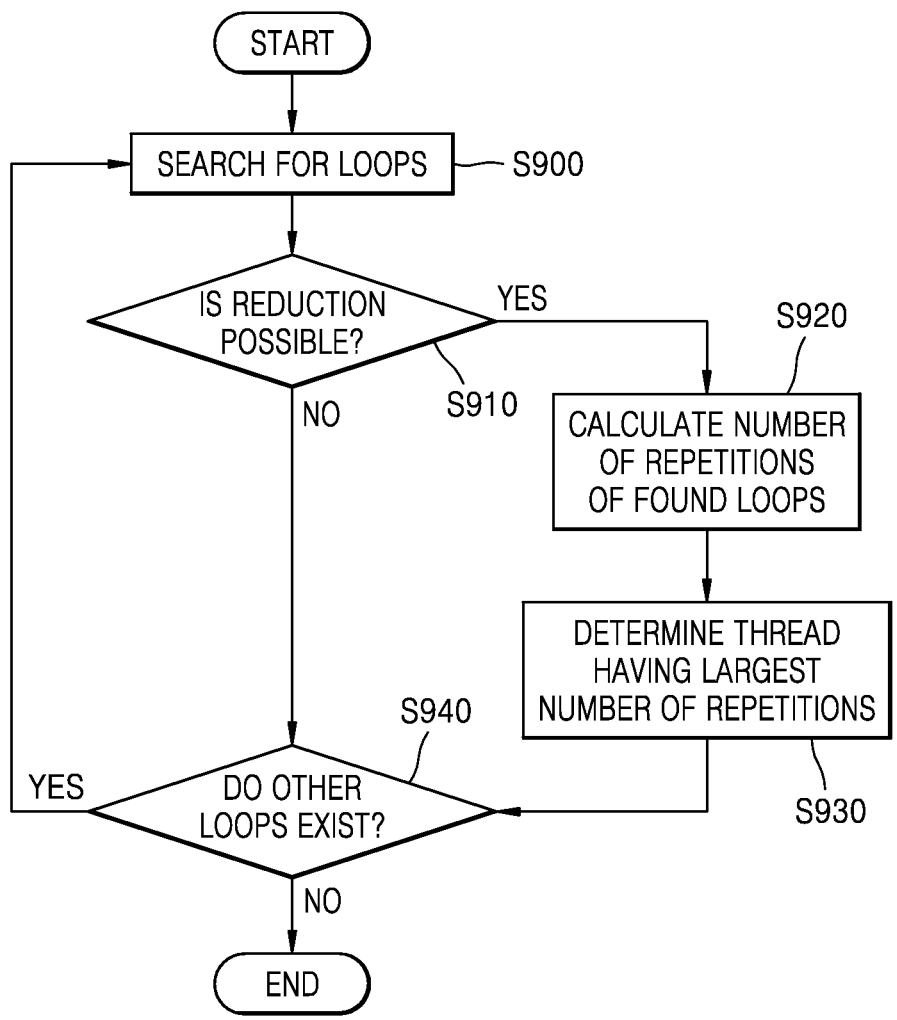
FIGS. 9 and 10 are flowcharts of multiple-thread processing methods according to additional example embodiments.

FIG. 9 is a flowchart of multiple-thread processing methods according to an embodiment.

An operation of a compiler in the multiple-thread processing method will be described below with reference to FIG. 9.

In operation S900, loops are searched for in a plurality of threads.

In operation S910, it is determined whether reduction in the result calculated in found loops is possible. If it is determined in operation S910 that the reduction in the result is impossible, the method proceeds to operation S940 to determine whether there is another loop. Otherwise, if it is determined in operation S910 that the reduction in the result is possible, the method proceeds to operation S920 to calculate the number of repetitions of the found loops. In operation S930, a thread having the largest number of repetitions is determined. In operation S940, it is determined whether there is another loop. If it is determined in operation S940 that there is another loop, the method returns to operation S900 to search for loops. Otherwise, if it is determined in operation S940 that there are no other loops, the operation of the multiple-thread processing apparatus 100 is ended.

Figure 10:
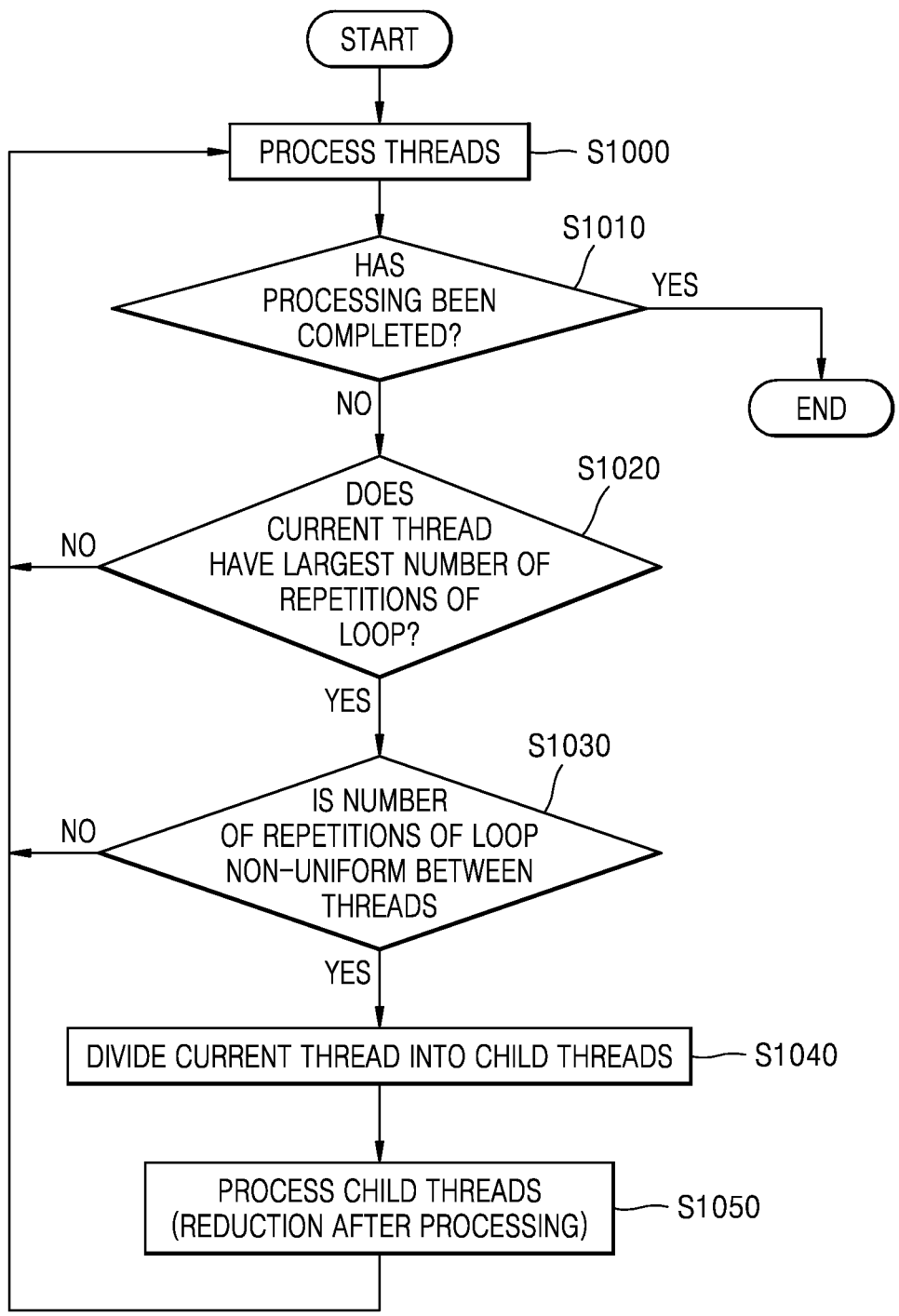

FIG. 10 is a flowchart of a multiple-thread processing method according to another embodiment.

In operation S1000, the multiple-thread processing apparatus 100 processes a plurality of threads.

In operation S1010, it is determined whether the multiple-thread processing apparatus 100 has completed the processing of the threads. If it is determined in operation S1010 that the multiple-thread processing apparatus 100 has completed the processing of the threads, the operation of the multiple-thread processing apparatus 100 is ended. Otherwise, if it is determined in operation S1010 that the multiple-thread processing apparatus 100 has not completed the processing of the threads, it is determined in operation S1020 whether a current thread is a thread having the largest number of repetitions of a loop. If it is determined in operation S1020 that the current thread is not the thread having the largest number of repetitions of the loop, the method returns to operation S1000 to execute other threads. Otherwise, if it is determined in operation S1020 that the current thread is the thread having the largest number of repetitions of the loop, it is determined in operation S1030 whether the number of repetitions of the loop is non-uniform between the threads. If it is determined in operation S1030 that the number of repetitions of the loop is not non-uniform between the threads, the method returns to operation S1000 to execute other threads. Otherwise, if it is determined in operation S1030 that the number of repetitions of the loop is non-uniform between the threads, the current thread is divided into child threads of each of the plurality of threads in operation S1040. In operation S1050, the threads each including the child threads are processed. A reduction is performed on the processed threads.

Figure 11:
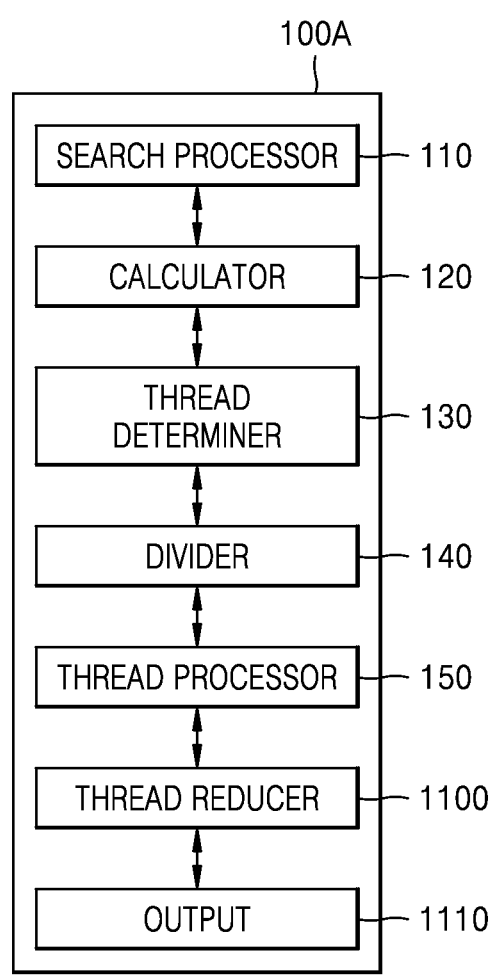
FIG. 11 is a block diagram of a multiple-thread processing apparatus according to another example embodiment.

FIG. 11 is a block diagram of a multiple-thread processing apparatus 100A according to another embodiment. The multiple-thread processing apparatus 100A may include a search unit 110, a calculation unit 120, a thread determination unit 130, a division unit 140, a processing unit 150, a reduction unit, or reducer 1100, and an output unit, or output 1110. The search unit 110, the calculation unit 120, the thread determination unit 130, the division unit 140, the processing unit 150, the reduction unit 1100 and the output unit 1110 may be interconnected as illustrated in FIG. 1, and may be implemented, for example, in the form of processors connected to a memory. The results of operations performed by the search unit 110, calculation unit 120, the thread determination unit 130, the division unit 140, the processing unit 150, the reduction unit 1100 and the output unit 1110 may be stored in the memory.

The search unit 110 searches for loops in a plurality of threads. The thread may mean an execution path existing in a process during execution of a computer program. The loop may mean a portion necessary to repeatedly process in a code to be processed in a thread of a processor. For example, the search unit 110 may search for a "for statement" in a code to be processed in a thread.

The calculation unit 120 calculates the number of repetitions of each of found loops. For example, the calculation unit 120 may calculate how many times the "for statement" is repeatedly executed in the code to be processed in the thread.

The thread determination unit 130 determines a thread based on the calculated number of repetitions of each of the found loops. In addition, the thread determination unit 130 may determine the rankings of the threads in descending order of the calculated number of repetitions of each of the found loops. Furthermore, the thread determination unit 130 may determine one or more threads based on the determined rankings of the threads. For example, the thread determination unit 130 may determine the top-ranked thread and the second-ranked thread. The thread determination unit 130 may determine whether parallel reduction in the loops of the determined threads is possible. This is because when the parallel reduction is impossible in the loops of the threads, a result obtained when the threads are processed by an existing method is different from a result obtained when the threads are divided and then processed.

The division unit 140 divides some of the determined threads into child threads. The division unit 140 may process threads other than the determined threads and then divide the determined threads into the child threads of each of the plurality of threads. Alternatively, the division unit 140 may process a plurality of threads and divide the determined threads into child threads of the processed threads among the plurality of threads.

The processing unit 150 processes the child threads separately in the plurality of threads. For example, the processing unit 150 may process a plurality of threads and then process the child threads included in the plurality of threads.

The reduction unit 1100 performs reduction on the processed threads. For example, the reduction unit 1100 may obtain a final result by performing reduction on the results of the processed threads. For example, when the number of threads is four, the result of the zeroth thread is 1, the result of the first thread is 2, the result of the second thread is 5, and the result of the third thread is 10, the reduction unit 1100 may obtain a final result of "1+2+5+10=18" by performing addition reduction on the results of the zeroth to third threads.

The output unit 1110 outputs the reduction result. For example, the output unit 1110 may display the reduction result on a display. Alternatively, the reduction result output from the output unit 1110 may be used as an input of other graphics processing.

Figure 12:
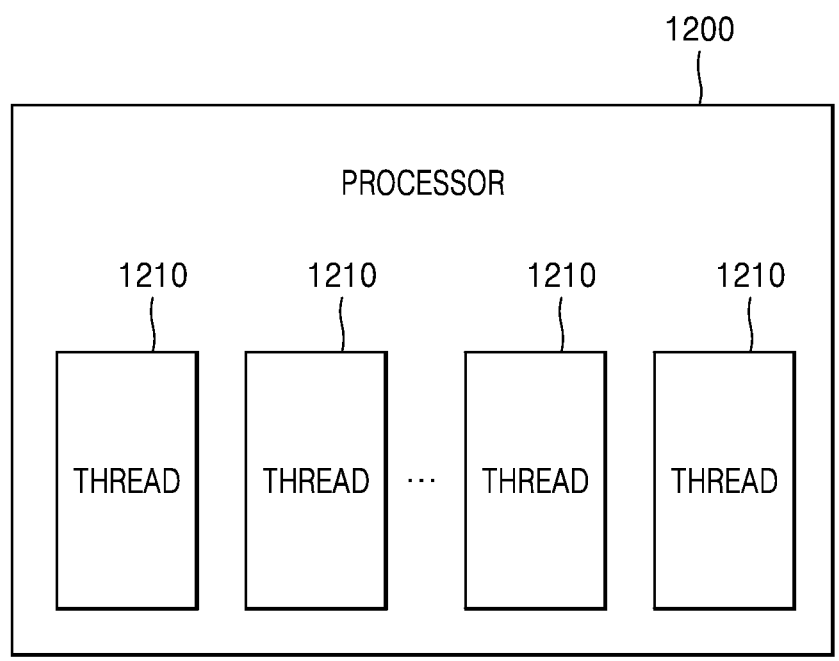
FIG. 12 is a block diagram of a processor that processes multiple threads.

FIG. 12 is a block diagram of a processor 1200 that processes multiple threads.

The processor 1200 may include a plurality of threads 1210. The processor 1200 may perform the same operation as the multiple-thread processing apparatuses 100 of FIGS. 1 and 11. For example, the processor 1200 may perform the operations of the search unit 110, the calculation unit 120, the thread determination unit 130, the division unit 140, the processing unit 150, the reduction unit 1100, and the output unit 1110. In addition, the threads 1210 in the processor 1200 of FIG. 12 may include the threads described above with reference to FIGS. 1 to 11.

The apparatuses according to the example embodiments may include a processor, a memory storing and executing program data, a permanent storage such as a disk drive, a communication port communicating with an external device, and a user interface such as a touch panel, a key, or a button.

The apparatuses, units, modules, devices, and other components illustrated in FIGS. 1, 11 and 12 that perform the operations described herein with respect to FIGS. 2, 3 and 5-10 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2, 3 and 5-10. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 3 and 5-10 that perform the operations described herein with respect to FIGS. 1, 11 and 12 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multiple-thread processing method comprising:
   executing respective code portions for a computer program, each of the respective code portions corresponding to graphic shader code that enables graphics processing;
   during execution of the respective code portions associated with the graphics processing, searching for loops by finding the loops in the respective code portions of respective threads among a plurality of threads;
   for each respective found loop executed by the respective code portions,
      determining whether parallel reduction is possible, and
      calculating a number of repetitions of the respective found loop for which parallel reduction is possible in each of the respective threads;
   determining rankings of the respective threads among the plurality of threads in descending order, according to the calculated number of repetitions of the respective found loop in each of the respective threads;
   selecting one or more threads based on the determined rankings for the respective threads, wherein the selected one or more threads includes at least a top-ranked thread having a largest number of repetitions of the respective found loop among the respective threads;
   for each selected thread of the selected one or more threads,
      determining whether the calculated number of repetitions of the respective found loop is non-uniform between the respective threads, and
      dividing the respective code portions of the selected thread into child threads respectively allocated among the plurality of threads, in response to determining that the respective found loop of the selected thread has the non-uniform number of repetitions between the respective threads;
   processing the child threads in parallel, each child thread executing separately from one another in each of the plurality of threads to which the child threads are respectively allocated;
   generating values in parallel for the child threads, one value for each of the separately executed child threads;
   upon completing processing of the plurality of threads including the child threads and generating the values in parallel for the child threads, performing the determined parallel reduction on the processed threads by merging the values of each of the separately executed child threads to generate a final reduction result value;
   outputting the final reduction result value; and
   executing the graphic shader code, utilizing the final reduction result value as input for processing a pixel associated with the graphics processing.

2. The multiple-thread processing method of claim 1, wherein the selected one or more threads further includes a second-ranked thread having a second largest number of repetitions of the respective found loop among the respective threads.

3. The multiple-thread processing method of claim 1, wherein outputting the final reduction result value includes displaying the final reduction result value.

4. A multiple-thread processing apparatus comprising:
   a memory storing computer-readable instructions; and
   at least one processor configured to execute the computer-readable instructions to,
      execute respective code portions for a computer program, each of the respective code portions corresponding to graphic shader code that enables graphics processing;
      during execution of the respective code portions associated with the graphics processing, search for loops by finding loops in respective threads among a plurality of threads;

for each respective found loop executed by the respective code portions,
   determine whether parallel reduction is possible, and calculate a number of repetitions of the respective found loop for which parallel reduction is possible in each of the respective threads;
determine rankings of the respective threads among the plurality of threads in descending order, according to the calculated number of repetitions of the respective found loop in each of the respective threads;
select one or more threads based on the determined rankings for the respective threads, wherein the selected one or more threads includes at least a top-ranked thread having a largest number of repetitions of the respective found loop among the respective threads;
for each selected thread of the selected one or more threads,
   determine whether the calculated number of repetitions of the respective found loop is non-uniform between the respective threads, and
   divide the respective code portions of the selected thread into child threads respectively allocated among the plurality of threads, in response to determining that the respective found loop of the selected thread has the non-uniform number of repetitions between the respective threads;
process the child threads in parallel, each child thread executing separately from one another in each of the plurality of threads to which the child threads are respectively allocated;
generate values in parallel for the child threads, one value for each of the separately executed child threads;
upon completing processing of the plurality of threads including the child threads and generating the values in parallel for the child threads, perform the determined parallel reduction on the processed threads by merging the values of each of the separately executed child threads to generate a final reduction result value;
output the final reduction result value; and
execute the graphic shader code, utilizing the final reduction result value as input for processing a pixel associated with the graphics processing.

5. The multiple-thread processing apparatus of claim 4, wherein the selected one or more threads further includes a second-ranked thread having a second largest number of repetitions of the respective found loop among the respective threads.

* * * * *